United States Patent [19]
Fujio et al.

[11] Patent Number: 4,879,363
[45] Date of Patent: Nov. 7, 1989

[54] ORGANIC GLASS FOR OPTICAL PARTS

[75] Inventors: Yoshiharu Fujio; Kanemasa Matsukuma; Toshihiko Nishimoto, all of Amagasaki, Japan

[73] Assignee: Daiso Co., Ltd., Osaka, Japan

[21] Appl. No.: 256,469

[22] Filed: Oct. 12, 1988

[30] Foreign Application Priority Data

Oct. 15, 1987 [JP]  Japan ................................ 62-261268

[51] Int. Cl.⁴ ............................................ C08F 18/18
[52] U.S. Cl. ..................................... 526/314; 526/322
[58] Field of Search ................................ 526/314, 322

[56] References Cited

U.S. PATENT DOCUMENTS 2,964,501  4/1960  Sarofeen ............................... 526/314
4,598,133  7/1986  Makno et al. ......................... 526/322

Primary Examiner—Joseph L. Schofer
Assistant Examiner—Jeffrey T. Smith
Attorney, Agent, or Firm—Wegner & Bretschneider

[57] ABSTRACT

Novel organic glass comprising a copolymer of (a) a diallyl phthalate monomer, (b) an allyl benzoate monomer and (c) a glycol bis(allylcarbonate) monomer, which has a high refractive index and excellent other physical properties such as high impact resistance, high dimension stability, excellent mechanical processing properties, excellent dyeability, excellent hard coating property, and is useful as a material for optical parts such as lenses and prisms.

8 Claims, No Drawings

ORGANIC GLASS FOR OPTICAL PARTS

This invention relates to an organic glass suitable as a material for optical parts, more particularly to a novel organic glass comprising a copolymer of a diallyl phthalate monomer, an allyl benzoate monomer and a glycol bis(allylcarbonate) monomer, which has a high refractive index and excellent other physical properties such as high impact resistance, high dimension stability, excellent mechanical processing properties, excellent dyeability, excellent hard coating property (e.g. excellent adhesion of coating glass film), and the like and is useful as a material for optical parts such as lenses and prisms.

PRIOR ART

Organic glass has been used as a material for optical parts, particularly lenses because of its lightweight in comparison with inorganic glass, and organic glass comprising a polymer of diethylene glycol bis(allycarbonate) or methyl methacrylate or the like has been used as a lens material. Among known organic glasses, organic glass comprising a polymer of diethylene glycol bis(allylcarbonate) has lightweight and excellent other physical properties such as high impact resistance, high dimension stability, excellent mechanical processing properties, excellent dyeability and excellent hard coating property, and hence, the demand thereof has rapidly increased for using as a lens material for eyeglasses, i.e. correcting one's eyesight, instead of inorganic glass in approximately the last ten years.

Although the organic glass comprising a polymer of diethylene glycol bis(allylcarbonate) has excellent properties as optical material as mentioned above, it has a refractive index of 1.499 which is lower than that of the conventional crown glass (inorganic glass) (its refractive index is 1.523). When this organic glass is used as a lens material for an eyeglass, it must be made thicker in comparison with an inorganic glass material, so that the material loses its merit of lightweight and further the eyeglass becomes unattractive. This tendency becomes stronger with incease of diopter of lens. Accordingly, the conventional organic glass is not necessarily suitable as a lens material for eyeglass.

In order to eliminate these drawbacks of the conventional organic glass, there have recently been developed various lens materials comprising diallyl phthalate polymers or bisphenol A derivatives which have a higher refractive index, for examples polymers of 2,2-bis(4-methacryloxyethoxyphenyl)propane, 2,2-bis(4-methacryloxyethoxy-3,5-dibromophenyl)propane, and the like, but these lens materials having high refractive index are somewhat disadvantageous in having less impact resistance and less processability and hence are still not necessarily satisfactory as a lens material for an eyeglass.

It is disclosed in Japanese Patent First Publication (Kokai) No. 7787/1978 that an organic glass comprising a copolymer of 15-80 wt. % of diallyl isophthalate and 85-20 wt. % of diethylene glycol bis(allylcarbonate) has a high refractive index of 1.5 or more and has improved adhesion of coating glass film. It is also disclosed in Japanese Patent First Publication (Kokai) No. 81318/1984 that an organic glass comprising a copolymer of 30-85 wt. % of diallyl phthalate and 70-15 wt. % of one or more unsaturated alcohol esters of benzoic acid (e.g. allyl benzoate) has an improved impact resistance and is useful as a lens material for an eyeglass.

Furthermore, there is disclosed in U.S. Pat. No. 4,598,133 organic glass for optical parts having a high refractive index and excellent other physical properties (particularly high impact resistance) which comprises a copolymer obtained by adding a polymerization initiator to a mixture of three monomer components of 30-85 wt. % of diallyl isophthalate, 10-65 wt. % of an unsaturated alcohol ester of benzoic acid and 5-35 wt. % of a methacrylic acid ester (e.g. benzyl methacrylate). It is disclosed in Japanese Patent Second Publication (Kokoku) No. 44686/1982 that organic glass comprising a terpolymer of 10-50 wt. % of diallyl isophthalate, 30-88 wt. % of diethylene glycol bis(allylcarbonate) and 2-20 wt. % of benzyl methacrylate has excellent dyeability and high impact resistance. There is further disclosed in U.S. Pat. No. 4,393,184 lenses having a high refractive index with a low dispersion which comprises a copolymer of 70-90 wt. % of diallyl phthalate and 30-10 wt. % of benzyl methacrylate.

SUMMARY DESCRIPTION OF THE INVENTION

An object of the invention is to provide an organic glass which has a high refractive index, excellent mechanical properties, chemical properties and optical properties and is useful as a material for optical parts such as lens and prisms. Another object of the invention is to provide a novel organic glass comprising a polymer of three monomer components of diallyl phthalate monomer, an allyl benzoate monomer and a glycol bis(allylcarbonate) monomer. These and other objects and advantages of the invention will be apparent to those skilled in the art from the following description.

DETAILED DESCRIPTION OF THE INVENTION

The organic glass for optical parts of the invention comprises a copolymer of
(a) a diallyl phthalate monomer,
(b) an allyl benzoate monomer, and
(c) a glycol bis(allylcarbonate) monomer.

The diallyl phthalate monomer (a) includes diallyl orthophthalate, diallyl isophthalate and diallyl terephthalate, which may be used alone or in combination of two or more thereof.

The allyl benzoate monomer (b) includes allyl benzoate and methallyl benzoate which may optionally be substituted on the benzene ring by an alkyl group having 1 to 6 carbon atoms or an alkoxy group having 1 to 6 carbon atoms. This component (b) is effective for improving the impact resistance of the diallyl phthalate without deteriorating its high refractive index.

The glycol bis(allylcarbonate) monomer (c) includes bis(allylcarbonates) of glycols such as ethylene glycol, diethylene glycol, triethylene glycol, etc., among which diethylene glycol bis(allylbenzoate) is advantageous because it is produced on industrial scale and hence is low cost. This component (c) is effective for improving dyeability and hard coating property of the organic glass for optical parts.

These components (a) to (c) contain an allyl group in the molecule thereof and hence have excellent copolymerizability and can be uniformly polymerized, so that there can be given a cured product having uniform optical properties (i.e. uniform refractive index).

These components (a) to (c) are preferably used in a ratio of 40 to 80 wt. %, more preferably 50 to 70 wt. %, of (a) component, 10 to 35 wt. %, more preferably 20 to 30 wt. %, of (b) component, and 5 to 50 wt. %, more preferably 10 to 20 wt., of (c) component.

As mentioned above, the component (b) is effective for improving impact resistance of the cured product, and hence, when it is used in an amount of less than 10 wt. %, the effect for improving the impact resistance is insufficient, and on the other hand, when the amount is over 35 wt. %, the product shows unfavorably lower heat distortion temperature and hence shows inferior dimension stability and processability. The component (c) has excellent dyeability and hard coating properties by itself and can give the excellent dyeability and hard coating property to the cured product. When the component (c) is used in an amount of less than 5 wt. %, the above excellent properties can not sufficiently be given to the cured product. Plastic materials for optical parts are usually subjected to hard coating in order to improve the surface hardness, but when the component (c) is used in less than 5 wt. %, the adhesion of coating film is insufficient. On the other hand, when the component (c) is used over 50 wt. %, the product has a refractive index of less than 1.54, and hence, the high refractive index owing to the diallyl phthalate component (a) is disadvantageously deteriorated. By incorporating the component (c), the product of this invention can advantageously be treated by the conventional hard coating process as used for the optical material produced from diethylene glycol bis(allylcarbonate).

In veiw of the preferred ratio of the components (b) and (c) for giving the desired properties to the organic glass of this invention, the amount of diallyl phthalate monomer (a) is selected from the range of 40 to 80 wt. % based on the whole weight of the monomers. In other words, in order to maintain the desired high refractive index of organic glass of this invention, the component (a) should be used in an amount of at least 40 wt. %.

The organic glass of this invention can be prepared by copolymerizing the above components (a) to (c) by any conventional method, for example by casting method, in the presence of a polymerization initiator. The copolymerization can also be carried out with irradiation of ionizing radiation such as X-ray, $\alpha$-ray, $\beta$-ray, and $\gamma$-ray, or ultraviolet.

The organic glass of this invention has lightweight and high refractive index and further excellent other physical properties, such as high impact resistance, high dimension stability, excellent mechanical processing properties, excellent dyeability, excellent hard coating property and further has long working life, and hence, is useful as a material for producing optical parts such as lens and prisms, particularly lens for eyeglass.

This invention is illustrated by the following Examples and Reference Examples but should not be construed to be limited thereto.

EXAMPLES 1-6 and REFERENCE EXAMPLES 1-3

To a mixture of each monomer of the components (a) to (c) as shown in Table 1 is added diisopropyl peroxydicarbonate (5 parts by weight) as a polymerization initiator, and the mixture is poured into a casting mold made of two glass-made circular plates (diameter 70 mm) and a gasket of ethylene-vinyl acetate copolymer wherein the mixture is polymerized. The polymerization reaction is carried out by heating the mixture in a circulating hot air oven at 40° C. for 5 hours, and thereafter, raising gradually the temperature from 40° C. to 80° C. over a period of 11 hours and keeping the temperature at 80° C. for 2 hours, and then cooling gradually to 60° C. After the polymerization reaction, the molded product is released from the casting mold and subjected to heat-treatment at 110° C. for 2 hours.

The molded product thus obtained was subjected to the following tests. The test results are shown in Table 2.

(1) Transmittance

It was measured by a luminous transmittance photomer as to a circular test plate (thickness: 2 mm).

(2) Refractive index

It was measured by Abbe refractometer as to the test plate as used in the above (1) which was cut and polished. The index was measured on two crossed surfaces of the polished test plate.

(3) Surface hardness

It was measured according to JIS K-5400 under a load of 1 kgf on the test plate as used in the above (1), and the hardness was shown by the pencil scratch hardness.

(4) Impact resistance

It was measured in accordance with the standard of FDA (Food and Drug Administration) as to two sets of circular specimens (each 10 lenses) having spherical surface (radius: 120 mm, thickness: 2 mm and diameter: 70 mm) but having no dioptric power. A steel ball weighing 16 g or 25 g was allowed to drop onto each specimen from a height of 127 cm, and the ratio of not broken specimens to 10 specimens was shown.

(5) Dyeability

The test plate as used in the above (1) was dipped in a brown color dyeing bath at 92° C. for 10 minutes, and thereafter, the luminous transmittance was measured like in the above (1).

(6) Hard coating property

The test plate as used in the above (1) was coated with a silicone hard coating liquid by a dipping method and the coating layer was cured at 100° C. for 4 hours. The coated specimen (the coating film thickness: about 3 μm) was subjected to adhesion test in accordance with JIS D-0202. That is, the coated film was crosscut with a knife to form hundred squares and thereon a cellophane adhesive tape was adhered and then peeled off. The test was repeated three times (each five specimens). The number of remaining squares was counted, and the average number of five specimens was shown. In Table 2, the number in first test means the number of the specimens which was subjected to the coating treatment, and the number in second test means the number of the specimens which was subjected to the coating treatment and then to the dyeing in the same manner as in the above (5).

TABLE 1

| Ex. No. | Component (a) | | | Component (b) | (part by weight) Component (c) |
| --- | --- | --- | --- | --- | --- |
| | DAOP | DAIP | DATP | ABZ | CR-39 |
| Ex. 1 | 70 | — | — | 20 | 10 |

TABLE 1-continued

| Ex. No. | Component (a) DAOP | DAIP | DATP | Component (b) ABZ | (part by weight) Component (c) CR-39 |
|---|---|---|---|---|---|
| Ex. 2 | — | 70 | — | 20 | 10 |
| Ex. 3 | — | — | 70 | 20 | 10 |
| Ex. 4 | — | — | 60 | 30 | 10 |
| Ex. 5 | — | — | 50 | 20 | 30 |
| Ex. 6 | — | — | 40 | 20 | 40 |
| Ref. Ex. 1 | — | — | 80 | 20 | — |
| Ref. Ex. 2 | — | — | 70 | — | 30 |
| Ref. Ex. 3 | — | — | — | — | 100 |

In the above Table 1, the abbreviations mean as follows:
DAOP: diallyl orthophthalate
DAIP: diallyl isophthalate
DATP: diallyl terephthalate
ABZ: allyl benzoate
CR-39: diethylene glycol bis(allylcarbonate)

TABLE 2

| Ex. No. | Transmittance (%) | Refractive index ($n_D^{25}$) | Surface hardness | Impact strength 16 g | 25 g | Dyeability (%) | Hard coating property First | Second |
|---|---|---|---|---|---|---|---|---|
| Ex. 1 | 92 | 1.562 | 2H | 10/10 | 10/10 | 53 | 100 | 100 |
| Ex. 2 | 92 | 1.564 | 2H | 10/10 | 10/10 | 55 | 100 | 100 |
| Ex. 3 | 92 | 1.564 | 2H | 10/10 | 10/10 | 52 | 100 | 100 |
| Ex. 4 | 92 | 1.563 | 2H | 10/10 | 10/10 | 48 | 100 | 100 |
| Ex. 5 | 92 | 1.550 | 2H | 10/10 | 10/10 | 49 | 100 | 100 |
| Ex. 6 | 92 | 1.543 | 2H | 10/10 | 10/10 | 45 | 100 | 100 |
| Ref.Ex.1 | 92 | 1.570 | 2H | 10/10 | 10/10 | 71 | 65 | 37 |
| Ref.Ex.2 | 92 | 1.554 | 2H | 10/10 | 2/10 | 52 | 100 | 100 |
| Ref.Ex.3 | 92 | 1.499 | 2H | 10/10 | 10/10 | 49 | 100 | 100 |

As is clear from the above test results, the organic glass of this invention maintained the high refractive index which is had by diallyl phthalate and further showed excellent properties necessary for optical parts (e.g. lens) such as excellent dyeability, hard coating property, impact resistance, etc. On the other hand, the product of Reference Example 1 lacking component (c) showed inferior dyeability and hard coating property, the product of Reference Example 2 lacking the component (b) showed inferior impact resistance, and the product of Reference Example 3 comprising only component (c) showed significantly lower refractive index.

In addition to the above excellent properties, the organic glass of this invention has an advantage that the conventional hard coating process applicable to the organic glass of diethylene glycol bis(allylcarbonate) per se can be applicable.

What is claimed is:

1. An organic glass for optical parts which comprises a copolymer of
   (a) 40 to 80 wt. % of a diallyl phthalate monomer,
   (b) 10 to 35 wt. % of an allyl benzoate monomer, and
   (c) 5 to 50 wt. % of a glycol bis(allylcarbonate) monomer.

2. The organic glass according to claim 1, wherein the ratio of the monomers are 50 to 70 wt. % of the diallyl phthalate monomer (a), 20 to 30 wt. % of the allyl benzoate monomer (b) and 10 to 20 wt. % of the glycol bis(allylcarbonate) monomer.

3. The organic glass according to claim 1, wherein the diallyl phthalate monomer (a) is a member selected from the group consisting of diallyl orthophthalate, diallyl isophthalate and diallyl terephthalate.

4. The organic glass according to claim 3, wherein the diallyl phthalate monomer (a) is diallyl isophthalate.

5. The organic glass according to claim 1, wherein the allyl benzoate monomer (b) is a member selected from the group consisting of allyl benzoate and methallyl benzoate which may optionally be substituted on the benzene ring by an alkyl group having 1 to 6 carbon atoms or an alkoxy group having 1 to 6 carbon atoms.

6. The organic glass according to claim 5, wherein the allyl benzoate monomer (b) is allyl benzoate.

7. The organic glass according to claim 1, wherein the glycol bis(allylcarbonate) monomer (c) is a member selected from the group consisting of bis(allylcarbonates) of a glycol selected from ethylene glycol, diethylene glycol, and triethylene glycol.

8. The organic glass according to claim 7, wherein the glycol bis(allylcarbonate) monomer (c) is diethylene glycol bis(allylcarbonate).

* * * * *